Figure 1:
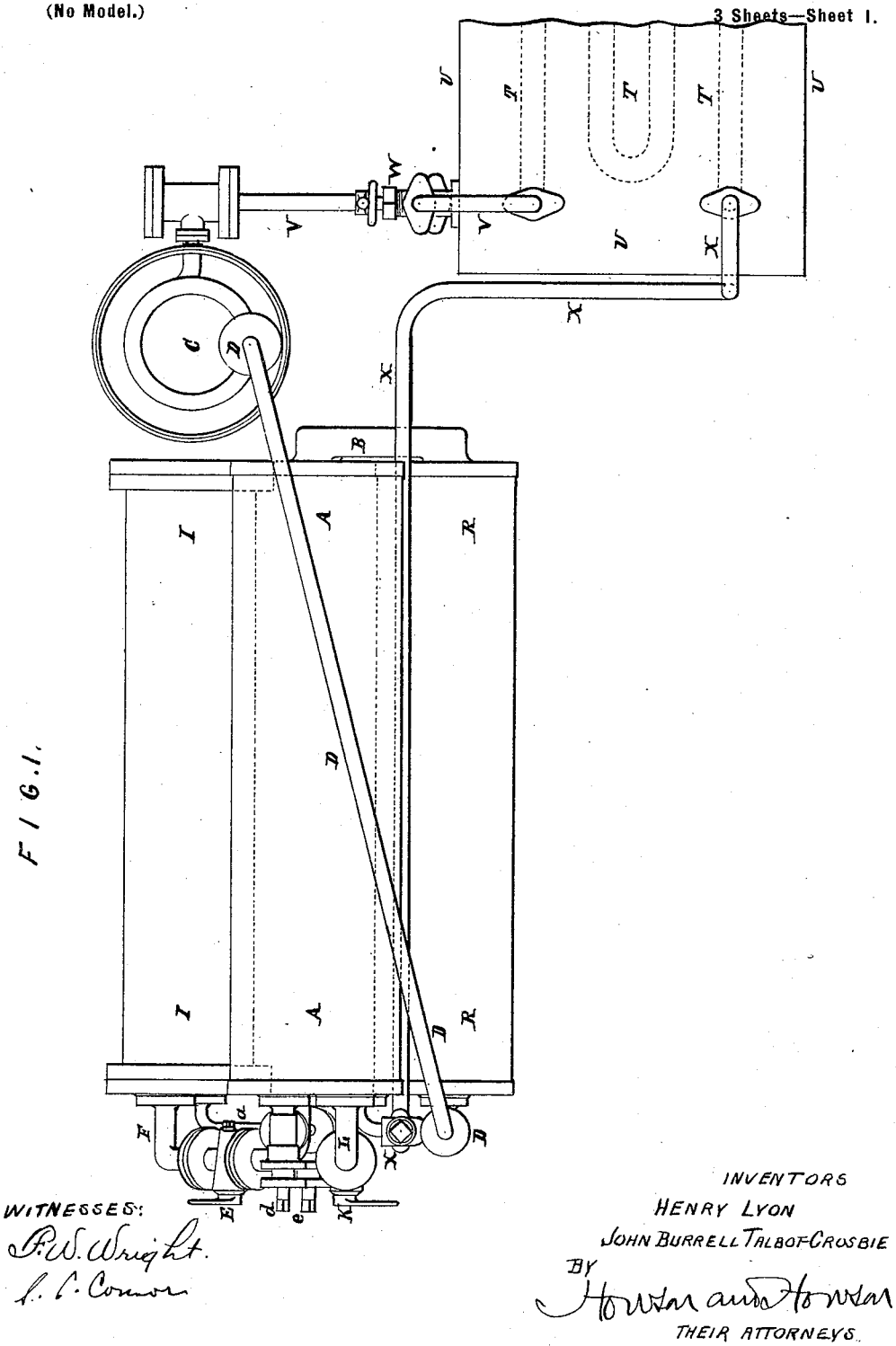

No. 635,560. Patented Oct. 24, 1899.
H. LYON & J. B. TALBOT-CROSBIE.
REFRIGERATING APPARATUS.
(Application filed Feb. 21, 1899.)

(No Model.) 3 Sheets—Sheet 1.

WITNESSES:
P. W. Wright.
L. C. Connor

INVENTORS
HENRY LYON
JOHN BURRELL TALBOT-CROSBIE
BY
Howson and Howson
THEIR ATTORNEYS No. 635,560. Patented Oct. 24, 1899.
H. LYON & J. B. TALBOT-CROSBIE.
REFRIGERATING APPARATUS.
(Application filed Feb. 21, 1899.)
(No Model.) 3 Sheets—Sheet 2.
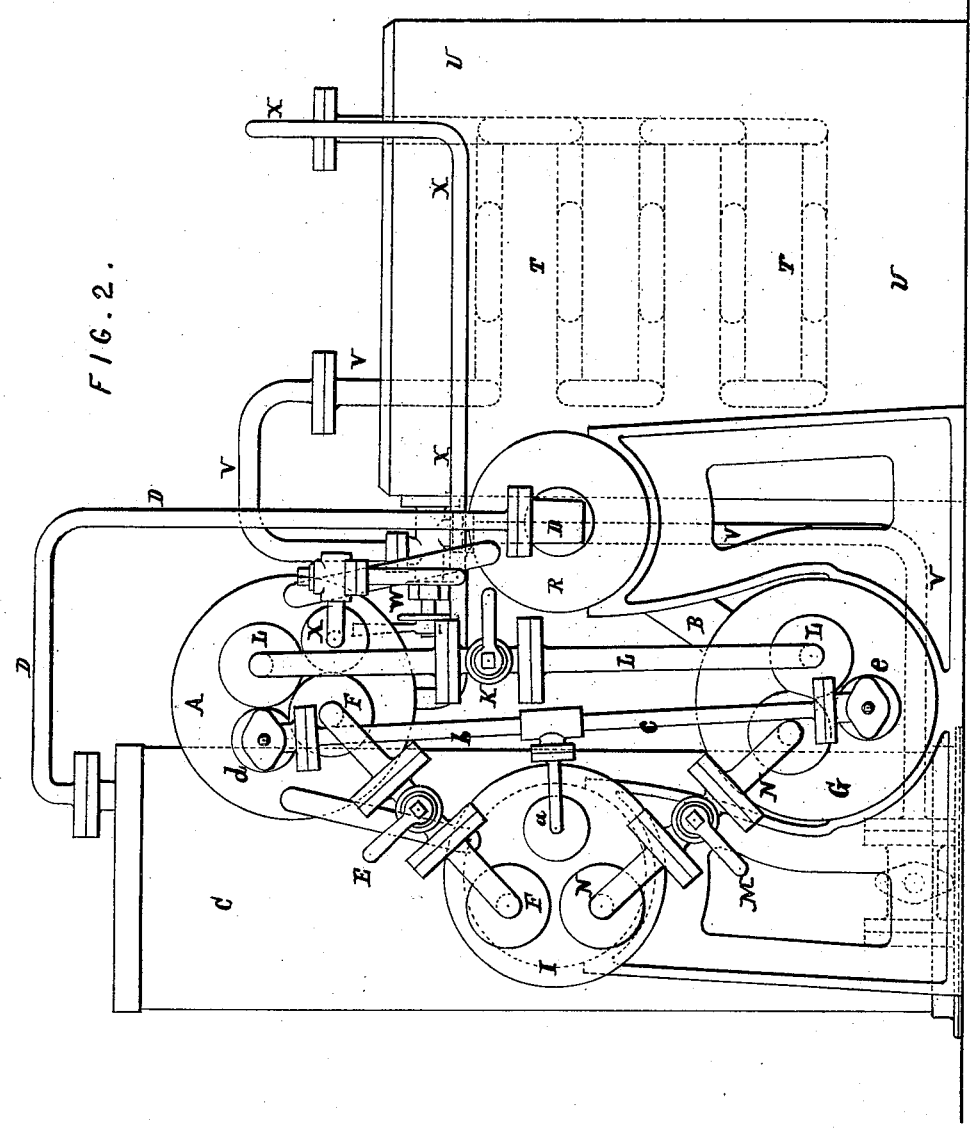
WITNESSES:
INVENTORS
HENRY LYON
JOHN BURRELL TALBOT-CROSBIE
BY
THEIR ATTORNEYS.

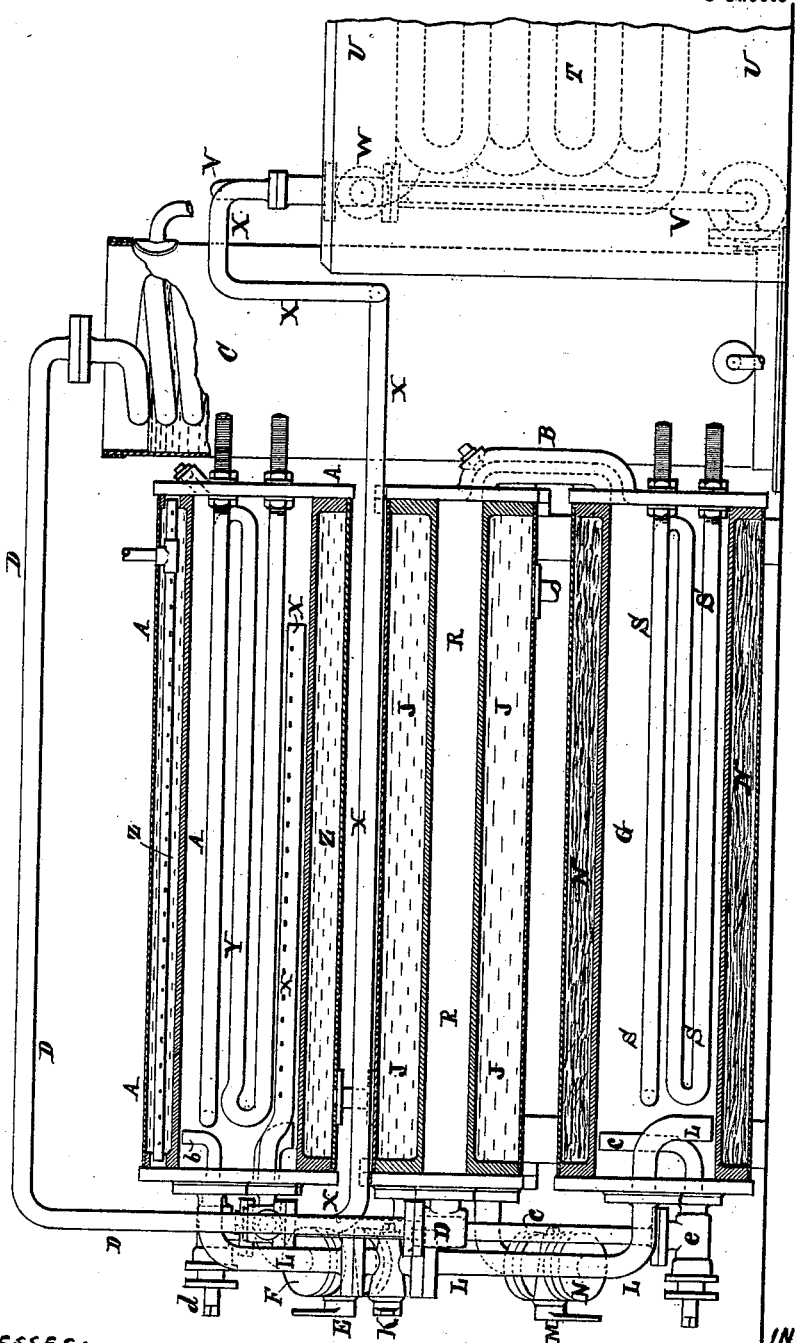

UNITED STATES PATENT OFFICE.

HENRY LYON AND JOHN BURRELL TALBOT-CROSBIE, OF GLASGOW, SCOTLAND.

REFRIGERATING APPARATUS.

SPECIFICATION forming part of Letters Patent No. 635,560, dated October 24, 1899.

Application filed February 21, 1899. Serial No. 706,367. (No model.)

*To all whom it may concern:*

Be it known that we, HENRY LYON and JOHN BURRELL TALBOT-CROSBIE, subjects of the Queen of Great Britain and Ireland, and residents of Glasgow, Scotland, have invented certain new and useful Improvements in Refrigerating Apparatus, of which the following is a specification.

Our said invention relates to refrigerating apparatus in which ammonia is employed; and it comprises improvements in the construction and arrangement of the apparatus, which consists of a series of closed vessels suitably connected and including a generator and an absorber which are not interchanged, as in some existing refrigerating apparatus.

Our improved apparatus is shown on three accompanying sheets of explanatory drawings, Figure 1 being a plan, Fig. 2 an end elevation, and Fig. 3 a vertical section.

The generator G and absorber A are cylindrical vessels placed horizontally, the absorber being at a higher level than the generator. Heat is applied in the generator G through a pipe S, through which steam is passed, or an electric heater or other known heating appliance may be used, and the vessel is incased in a shell packed with a material N, which is a bad conductor of heat. The upper part of the generator G is connected by a pipe B to the lower part of a vessel R, termed a "rectifier," which is kept at a moderate temperature by a water-jacket J and in which ammonia-vapor entering it from the generator G separates from traces of water, which return to the generator. From the rectifier R the ammonia-vapor passes through a pipe D to a warm condenser or other condenser C, in which it is acted on by cold water, so as to become cooled and liquefied.

The condensed ammonia is employed in the ordinary way, so as by its expansion in tubing T, (indicated by dotted lines,) immersed in brine or the like in a tank U, to produce refrigeration, the ammonia proceeding from the condenser C by a pipe V, having on it a regulating stop-valve W, to the expansion-tubing T. From the expansion-tubing the ammonia-vapor passes by a pipe X into the absorber A, which is provided with an internal pipe-coil Y and with an external jacket Z, through which cold water is passed.

At the commencement of an operation the absorber A will be partly filled with water or with a weak solution of ammonia, there being then in the generator G a strong solution of ammonia. During the operation the solution in the generator G becomes weakened because of the evaporation of the ammonia, while that in the absorber A becomes strengthened by absorbing ammonia-vapor from the expansion-tubes T, and when the operation has been continued as long as is considered desirable the strong solution in the absorber is run through a stop-cock E and pipe F into an intermediate vessel I, which is at a higher level than the generator G. Then there is opened a stop-cock K on a pipe L, which extends from the absorber A down to the lower part of the generator G, whereupon owing to the excess of the pressure in the generator over that in the absorber the weak solution in the former is transferred to the latter. Finally, a stop-cock M in a pipe N, connecting the intermediate vessel I with the generator, is opened, and the strong solution is run into the generator ready for a fresh operation.

The intermediate vessel I has connected to it a pipe $a$, with branches $b$ $c$ connected to the absorber A and to the generator G, the branches having stop-valves $d$ $e$, these connections being for equalizing the pressures. Thus when the solution is being transferred from the absorber A to the intermediate vessel I the upper valve $d$ is opened, the lower one $e$ being closed, and when the solution is being transferred from the intermediate vessel I to the generator G the upper valve $d$ is closed and the lower one $e$ opened.

The vessels, pipes, and stop-valves may be made of any suitable metal, and the vessels may be cylindrical or of any other convenient simple form.

What we claim is—

1. In apparatus for refrigerating by the evaporation, condensation, expansion and absorption of ammonia, the combination of parts comprising a generator or vessel for heating and evaporating a strong solution of ammonia, a condenser connected by a pipe to the generator, expansion-tubing connected to the condenser and immersed in brine or the like, an absorber placed at a higher level than the generator and connected to the expansion-tubing, an intermediate vessel connected by a pipe to the absorber to receive the solution of ammonia therefrom, and at a higher level than the generator, a pipe connecting the intermediate vessel with the generator, a pressure-equalizing pipe connecting the absorber and generator, an additional pressure-equalizing pipe connecting said pipe with the intermediate vessel, stop-valves on the various connecting-pipes, means for heating the generator, and means for cooling the absorber, substantially as described.

2. In a refrigerating apparatus, the combination with the generator, the absorber placed at a higher level than the generator, an intermediate vessel placed between the generator and absorber and at a higher level than the generator, pipes connecting the generator, the absorber and the intermediate vessel, of a pressure-equalizing pipe connecting the generator and absorber, and an additional pressure-equalizing pipe connecting said pipe with the intermediate vessel, said connecting-pipes being provided with suitable valves, substantially as described.

In testimony whereof we have signed our names to this specification in the presence of two subscribing witnesses.

HENRY LYON.
    JOHN BURRELL TALBOT-CROSBIE.

Witnesses:
  GEORGE PATTERSON,
  WILFRED HUNLY.